(12) United States Patent
Kobayashi

(10) Patent No.: US 10,893,176 B1
(45) Date of Patent: Jan. 12, 2021

(54) IMAGING DEVICE, ELECTRONIC TERMINAL, AND IMAGING SYSTEM

(71) Applicant: Panasonic Intellectual Property Management Co., Ltd., Osaka (JP)

(72) Inventor: Hideto Kobayashi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/658,068

(22) Filed: Oct. 19, 2019

(30) Foreign Application Priority Data

Jul. 11, 2019 (JP) .................................. 2019-129304

(51) Int. Cl.
- *H04N 5/225* (2006.01)
- *H04N 5/232* (2006.01)
- *G03B 17/02* (2006.01)

(52) U.S. Cl.
CPC .......... *H04N 5/2252* (2013.01); *G03B 17/02* (2013.01); *H04N 5/23227* (2018.08); *H04N 5/23203* (2013.01)

(58) Field of Classification Search
CPC .. H04N 1/00204; H04N 1/2137; H04N 1/215; H04N 2201/0049; H04N 2201/0075; H04N 2201/0084; H04N 5/23206; H04N 5/23245; H04N 5/23203; H04N 5/2252; H04N 5/23227; G03B 17/02
See application file for complete search history.

(56) References Cited

U.S. PATENT DOCUMENTS

| | | | | |
|---|---|---|---|---|
| 2013/0335584 | A1* | 12/2013 | Kato | G06F 3/005 348/207.1 |
| 2015/0319354 | A1* | 11/2015 | Ichikawa | H04N 5/765 348/211.2 |
| 2016/0344933 | A1* | 11/2016 | Mukai | G03B 7/097 |
| 2017/0064128 | A1* | 3/2017 | Takeuchi | H04N 5/23203 |
| 2017/0328976 | A1* | 11/2017 | Oshima | H04N 5/232 |
| 2019/0065857 | A1* | 2/2019 | Takashima | H04N 1/2137 |

FOREIGN PATENT DOCUMENTS

| | | |
|---|---|---|
| JP | 2001-268424 A | 9/2001 |
| JP | 2015-095799 A | 5/2015 |
| JP | 2019-041372 A | 3/2019 |

\* cited by examiner

*Primary Examiner* — Amy R Hsu

(74) *Attorney, Agent, or Firm* — Renner, Otto, Boisselle & Sklar, LLP

(57) ABSTRACT

In a camera body capable of connecting to an electronic terminal, an imaging element captures an image of a subject and generates a live-view image. A transmission unit transmits the live-view image to the electronic terminal. A reception unit 191b receives, from the electronic terminal, an imaging request for the camera body. A body controller controls the imaging element, the transmission unit, and the reception unit. The body controller executes imaging performed by the imaging element and acquires a first image frame, which is a captured image, in response to the imaging request. The transmission unit transmits the live-view image to the electronic terminal after the imaging request without any interruption caused by transmission of the first image frame in response the imaging request.

9 Claims, 8 Drawing Sheets

IMAGING DEVICE, ELECTRONIC TERMINAL, AND IMAGING SYSTEM

CROSS-REFERENCE TO RELATED APPLICATION

This application claims the benefit of foreign priority to Japanese Patent Application No. 2019-129304, filed on Jul. 11, 2019. The entire disclosure of Japanese Patent Application No. 2019-129304 is hereby incorporated herein by reference.

BACKGROUND

Technical Field

The present disclosure relates to an imaging device, an electronic terminal capable of connecting to the imaging device, and an imaging system provided with the imaging device and the electronic terminal.

Background Art

Japanese Laid-open Patent Publication No. 2015-95799 discloses a system to transmit image data from a camera to an electronic terminal. In this system, the camera generates a low-resolution live-view image in sequence from an output signal of an imaging element, and then transmits the low-resolution live-view image through UDP to the electronic terminal at a prescribed transmission rate. When a user makes an input operation to the electronic terminal for photographing one static image, a single-shot command is sent to the camera. Having received the single-shot command, the camera acquires one static image (single-shot image) using the imaging element and transmits high-resolution image data of the static image through TCP to the electronic terminal.

In the system disclosed in Japanese Laid-open Patent Publication No. 2015-95799, when the single-shot command is outputted from the electronic terminal during transmission of the live-view image from the camera to the electronic terminal, the camera interrupts transmission of the live-view image and transmits the single-shot image to the electronic terminal. After the electronic terminal has received the single-shot image, the camera restarts transmission of the live-view image. When the user performs an imaging manipulation on the electronic terminal, the live-view image is not transmitted to the electronic terminal from when the imaging manipulation is performed until when a captured image is transmitted from the camera to the electronic terminal. Therefore, there is a concern that the user will not get to see the live-view image after the imaging operation, and there is a possibility that imaging manipulations cannot be performed in succession and an opportunity to capture an image will be lost.

BRIEF SUMMARY

One object of the present disclosure is to provide an imaging device, an electronic terminal, and an imaging system that are effective to suppress interruption of transmission and reception of a live-view image during imaging and to quickly and smoothly perform an imaging operation in a case where the electronic terminal connected to the imaging device is manipulated and imaging is performed.

An imaging device according to the present disclosure is capable of connecting to an electronic terminal. The imaging device comprises an imaging unit, a first transmission unit, a first reception unit, and a first controller. The imaging unit captures an image of a subject and generates a live-view image. The first transmission unit transmits the live-view image to the electronic terminal. The first reception unit receives an imaging request for the imaging device from the electronic terminal. The first controller controls the imaging unit, the first transmission unit, and the first reception unit. The first controller executes imaging using the imaging unit and acquires a first image frame, which is a captured image, in response to the imaging request. The first transmission unit transmits the live-view image to the electronic terminal after the imaging request without any interruption caused by the transmission of the first image frame in response to the imaging request.

An electronic terminal according to the present disclosure is capable of connecting to an imaging device. The electronic terminal comprises a manipulation unit, a second transmission unit, a second reception unit, a display unit, and a second controller. The manipulation unit receives input of a manipulation for operating the imaging device. The second transmission unit transmits an imaging request to the imaging device. The second reception unit receives a live-view image from the imaging device. The display unit displays the live-view image. The second controller controls the second transmission unit, the second reception unit, and the display unit. The second reception unit receives the live-view image after the imaging request without any interruption caused by transmission of a second image frame, which is a captured image acquired by executing imaging in response to the imaging request.

An imaging system according to the present disclosure comprises the aforementioned electronic terminal and the aforementioned imaging device. The electronic terminal and the imaging device are capable of communicating through a first communication protocol and a second communication protocol that is less reliable but faster than the first communication protocol. The electronic terminal and the imaging device communicate using the second communication protocol when transmitting or receiving a live-view image, and communicate using the first communication protocol when transmitting or receiving an image captured by the imaging device.

The imaging device, electronic terminal, and imaging system of the present disclosure are effective to suppress interruption of transmission and reception of a live-view image during imaging and to quickly and smoothly perform an imaging operation in a case where the electronic terminal connected to the imaging device is manipulated and imaging is performed.

DETAILED DESCRIPTION

Embodiments of the present disclosure are described in detail below with reference to the drawings as appropriate. In some cases, detailed descriptions are omitted out of necessity. For example, there are cases where detailed descriptions of matters that are already well known and/or repetitive descriptions for substantially equivalent configurations are omitted. A purpose of such omission is to avoid unnecessary redundancy in the description and to facilitate understanding of persons skilled in the art.

The accompanying drawings and the description below are provided in order for persons skilled in the art to adequately understand the present disclosure, and are not intended to limit the matter set forth in the claims.

1. Embodiment 1

1-1. Configuration

Figure 1:
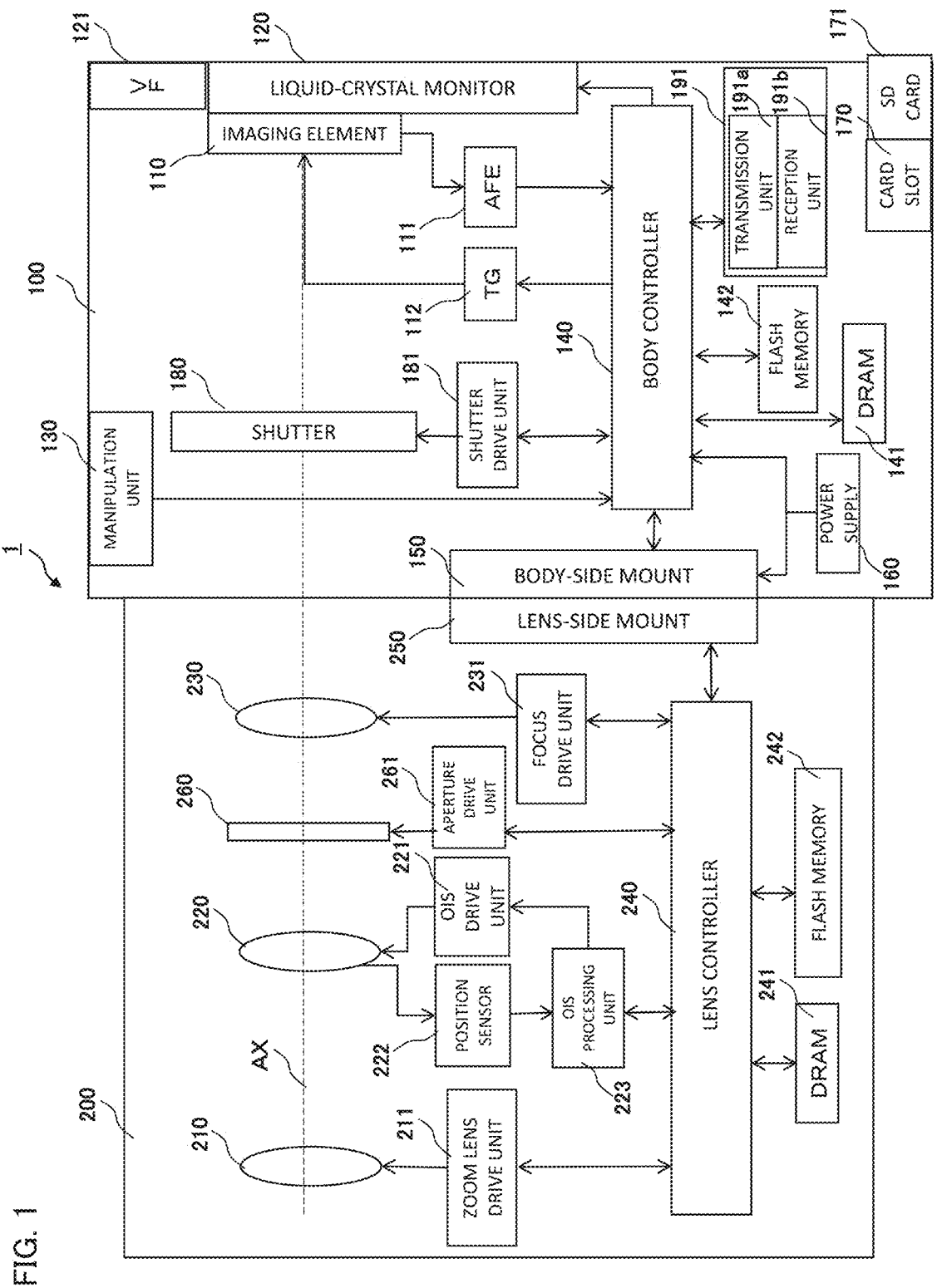
FIG. 1 shows an overall configuration of an imaging device in embodiment 1.

FIG. 1 shows a configuration of a camera system 1 according to embodiment 1. The camera system 1 is configured from a camera body 100 (one example of an imaging device), and an exchangeable lens 200 that is detachable from the camera body 100.

In FIG. 1, electrical configurations including detailed power supply lines of the camera body 100 and the exchangeable lens 200 are omitted.

1-1-1. Configuration of Camera Body

The camera body 100 is, e.g., a mirrorless imaging device that is not provided with an optical finder. The camera body 100 is provided with a body controller 140, an imaging element 110, a liquid-crystal monitor 120, a view-finder (VF) 121, a manipulation unit 130, a body-side mount 150, a power supply 160, a card slot 170, a shutter 180, and a communication unit 191.

The body controller 140 (one example of a first controller) is configured from, for example: a central processing unit (CPU), a micro processing unit (MPU), or another such computation processing circuit; a non-volatile memory; and a peripheral circuit. The body controller 140 reads and executes a control program stored within the non-volatile memory in accordance with a signal from the manipulation unit 130 or a signal received via the communication unit 191, thereby controlling the operation of the camera body 100. The body controller 140 drives the imaging element 110 and executes an imaging operation in accordance with an imaging request signal received from an electronic terminal 300 (FIG. 2) via the communication unit 191, as described below. The body controller 140 uses a DRAM 141 as a working memory when a control operation or image processing operation is performed. The body controller 140 uses a flash memory 142 as a memory to store data used in communication with the electronic terminal 300 (FIG. 2), as described below. A GPU, a DSP, an FPGA, an ASIC, and various other processors can also be implemented as the body controller 140. The body controller 140 may be configured from one or a plurality of processors.

The imaging element 110 (one example of an imaging unit) is configured from a complementary metal oxide semiconductor (CMOS) sensor, which converts a subject image (optical image) formed by an optical system of the exchangeable lens 200 to an electrical signal by photoelectric conversion. The imaging element 110 captures an image of a subject, generates image data, and outputs the image data. The generated image data is digitized by an analog front end (AFE) 111. The image data digitized by the AFE 111 is subjected to prescribed image processing by the body controller 140. The prescribed image processing is, e.g., a gamma correction process, a white-balance correction process, a flaw correction process, a YC conversion process, an electronic zoom process, or a JPEG compression process. The imaging element 110 operates at a timing controlled by a timing generator (TG) 112. Operations performed by the imaging element 110 include operations to capture static images and/or video images. The imaging element 110 may be configured from a charge coupled device (CCD) sensor.

The liquid-crystal monitor 120 is configured from a liquid-crystal panel. The liquid-crystal monitor 120 displays an image subjected to image processing by the body controller 140. The liquid-crystal monitor 120 is capable of selectively displaying both static images and video images. The liquid-crystal monitor 120 may be configured from an organic electroluminescence (EL) panel instead of a liquid-crystal panel.

The view-finder 121 is disposed on an upper part of a rear surface of the camera body 100. Similarly to the liquid-crystal monitor 120, the view-finder 121 displays an image processed by the body controller 140. An image may be displayed on both the liquid-crystal monitor 120 and the view-finder 121 at the same time, or may be displayed only on either one of these.

The manipulation unit 130 receives a manipulation performed by a user. For example, the manipulation unit 130 includes, inter alia, a release button provided to an upper surface of the camera body 100, a power supply switch, a mode dial, a center button or a cross button provided to a rear surface of the camera body 100, and/or a touch panel layered on the liquid-crystal monitor 120. Upon receiving a manipulation performed by the user, the manipulation unit 130 transmits, to the body controller 140, a signal to order various operations.

The body-side mount 150 has a plurality of connection terminals and is configured to be capable of mechanically and electrically connecting to a lens-side mount 250 of the exchangeable lens 200 via the plurality of connection terminals. The body-side mount 150 also supplies power received from the power supply 160 to the exchangeable lens 200 via the lens-side mount 250. Upon sensing mounting of the exchangeable lens 200, the body-side mount 150 also receives ID information and lens parameters pertaining to the exchangeable lens 200 and transmits the ID information and the lens parameters to the body controller 140.

The power supply 160 supplies power to be consumed by the camera system 1. The power supply 160 may be, e.g., a dry cell or a rechargeable cell. The power supply 160 may also supply power to the camera system 1 from the outside via a power supply cord.

The card slot 170 can have an SD card 171 mounted therein, and controls the SD card 171 on the basis of a control from the body controller 140. The SD card 171 is capable of storing an image file generated due to image processing by the body controller 140.

The shutter 180 is disposed on a front surface of the imaging element 110. In an imaging operation, the shutter 180 opens and closes due to driving by a shutter drive unit 181 controlled by the body controller 140.

The communication unit 191 includes an antenna and a wireless communication circuit, and wirelessly connects to an electronic terminal 300 (FIG. 2) in accordance with a prescribed communication standard. The communication unit 191 transmits and receives data to and from the wirelessly connected electronic terminal 300 by using the antenna. The communication standard is discretionary; for example, a Wi-Fi® standard is used as the communication standard. The communication unit 191 includes a transmission unit 191a and a reception unit 191b. Upon acquiring a transmission packet, the transmission unit 191a (one example of a first transmission unit) modulates a data string, generates a signal, and transmits the signal using the antenna. The reception unit 191b (one example of a first reception unit) demodulates a signal received from the antenna and acquires a reception packet.

1-1-2. Configuration of Exchangeable Lens

The exchangeable lens 200 is provided with an optical system, a lens controller 240, and the lens-side mount 250. The optical system includes a zoom lens 210, an OIS lens 220, an aperture 260, and a focus lens 230.

The zoom lens 210 is a lens for changing a magnification of a subject image generated by the optical system. A zoom lens drive unit 211 includes, inter alia, a zoom ring that can be manipulated by the user. The lens drive unit 211 conveys a manipulation performed by the user to the zoom lens 210 and causes the zoom lens 210 to move along an optical axis AX of the optical system.

The OIS lens 220 is a lens for stabilizing the subject image generated by the optical system of the exchangeable lens 200, and is driven by an OIS drive unit 221. The OIS drive unit 221 drives the OIS lens 220 within a plane perpendicular to the optical axis AX of the optical system according to a control by an OIS processing unit 223. A position sensor 222 detects a position of the OIS lens 220 within the plane perpendicular to the optical axis AX of the optical system.

The aperture 260 is a member for adjusting an amount of light passing through the optical system. An aperture drive unit 261 is drive means for opening and closing an opening of the aperture 260, the aperture drive unit 261 including, e.g., a stepping motor.

The focus lens 230 is a lens for changing a state of focus of the subject image formed on the imaging element 110 by the optical system. A focus drive unit 231 includes, e.g., a stepping motor, and drives the focus lens 230 so as to advance and retreat along the optical axis AX of the optical system according to a control from the lens controller 240.

The lens controller 240 is configured from: a central processing unit (CPU), a micro processing unit (MPU), or another such computation processing circuit; a memory; and a peripheral circuit. The lens controller 240 controls the entire exchangeable lens 200 on the basis of a control signal from the body controller 140. The lens controller 240 performs transmission and reception to and from the body controller 140 via the lens-side mount 250 and the body-side mount 150. The lens controller 240 uses a DRAM 241 as a working memory during control. In addition, a flash memory 242 saves programs and lens parameters used during control by the lens controller 240.

The lens-side mount 250 has a plurality of connection terminals and is configured to be capable of mechanically and electrically connecting to the body-side mount 150 of the camera body 100 via the plurality of connection terminals. The lens-side mount 250 is capable of transmitting and receiving data to and from the body-side mount 150, as described above.

In the present embodiment, an exchangeable lens that is detachable from the camera body 100 is employed, but a lens formed integrally with the camera body 100 may also be employed.

1-1-3. Electronic Terminal

Figure 2:
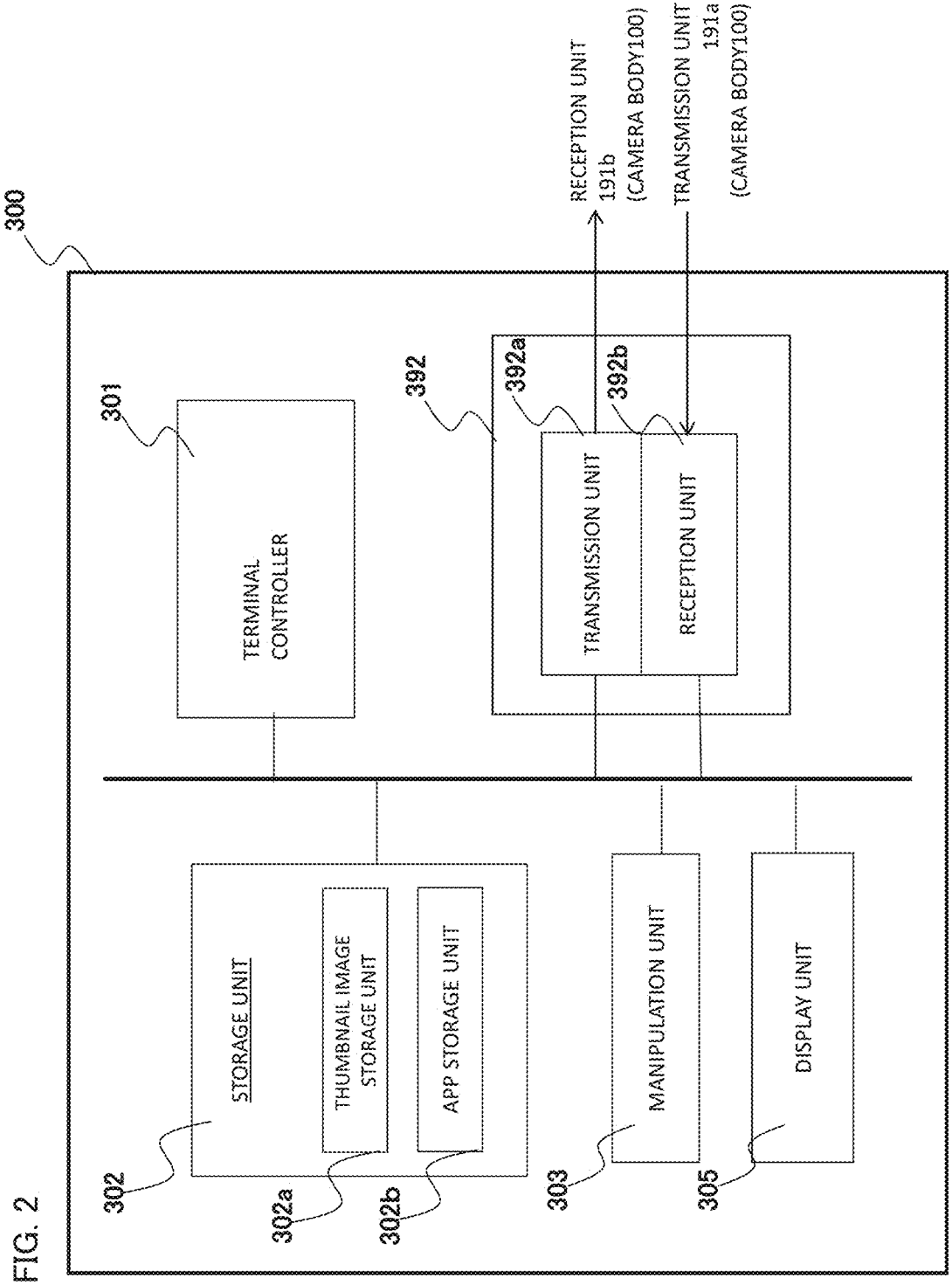
FIG. 2 shows a configuration of an electronic terminal in embodiment 1.

FIG. 2 is a block diagram showing an internal configuration of the electronic terminal 300. The electronic terminal 300 is, e.g., a smartphone, a tablet, a personal computer, or another such computer device. The electronic terminal 300 is provided with: a terminal controller 301 to control a general operation of the electronic terminal 300; a storage unit 302 to store data, programs, etc.; a manipulation unit 303 by which the user manipulates the electronic terminal 300; a display unit 305 to display an image; and a communication unit 392 to perform wireless communication with an external apparatus.

The terminal controller 301 (one example of a second controller) implements a prescribed function by executing a prescribed control program, and is configured from, e.g.: a central processing unit (CPU), a micro processing unit (MPU), or another such computation processing circuit; a memory; and a peripheral circuit. The control program executed by the terminal controller 301 may be provided via a network or may be provided by a recording medium. A GPU, a DSP, an FPGA, an ASIC, and various other processors can also be implemented as the terminal controller 301. The terminal controller 301 may be configured from one or a plurality of processors.

The storage unit 302 is a recording medium to store data, a program, and a parameter necessary for the electronic terminal 300 to implement a function. The storage unit 302 stores the control program executed by the terminal controller 300, and various data. The storage unit 302 is configured from, e.g., a semiconductor memory that includes a flash memory, a hard disk (HDD), etc. The storage unit 302 includes: a thumbnail image storage unit 302a to store a thumbnail image (described below); and an app storage unit 302b to store a prescribed application program (app) that enables remote manipulation of the camera body 100, as described below.

The manipulation unit 303 (one example of a manipulation unit) is a device to receive a manipulation performed by a user, and is configured from, e.g., at least one of a keyboard, a mouse, a touch panel, etc.

The display unit 305 (one example of a display unit) is configured from, e.g., a liquid-crystal display or an organic EL display.

The communication unit 392 includes an antenna and a wireless communication circuit, and wirelessly connects to the camera body 100 in accordance with a prescribed communication standard. The communication unit 392 is capable of transmitting and receiving data to and from the wirelessly connected camera body 100 using the antenna. The communication standard is discretionary; for example, a Wi-Fi® standard is used as the communication standard. The communication unit 392 includes a transmission unit 392a and a reception unit 392b. Upon acquiring a transmission packet, the transmission unit 392a (one example of a second transmission unit) modulates a data string, generates a signal, and transmits the signal using the antenna. The reception unit 392b (one example of a second reception unit) demodulates a signal received using the antenna and acquires a reception packet.

1-1-4. Communication Protocols

Communication between the camera body 100 and the electronic terminal 300 is performed using user datagram protocol (UDP) or transmission control protocol (TCP), which are types of communication protocols.

Figure 3A:
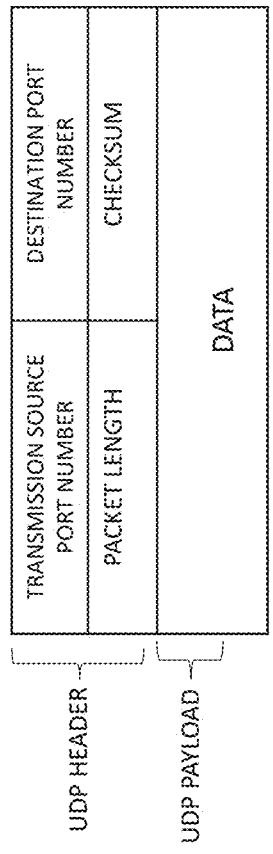
FIG. 3A shows a structure of a UDP packet.

In UDP, desired data is transmitted or received by transmitting or receiving a UDP packet in a prescribed format. FIG. 3A shows a structure of a UDP packet. The UDP packet is composed of a UDP header and a UDP payload. Information stored in the UDP header includes a transmission source port number to indicate a port number of a transmission source of the UDP packet, a destination port number to indicate a port number that is to receive the UDP packet (i.e., a port number of an apparatus to receive the UDP packet), a packet length of the entire UDP packet, and a checksum (a value used in order to perform error checking on the UDP header and a data portion). Data having a prescribed maximum data length is stored in the UDP payload.

Figure 3B:
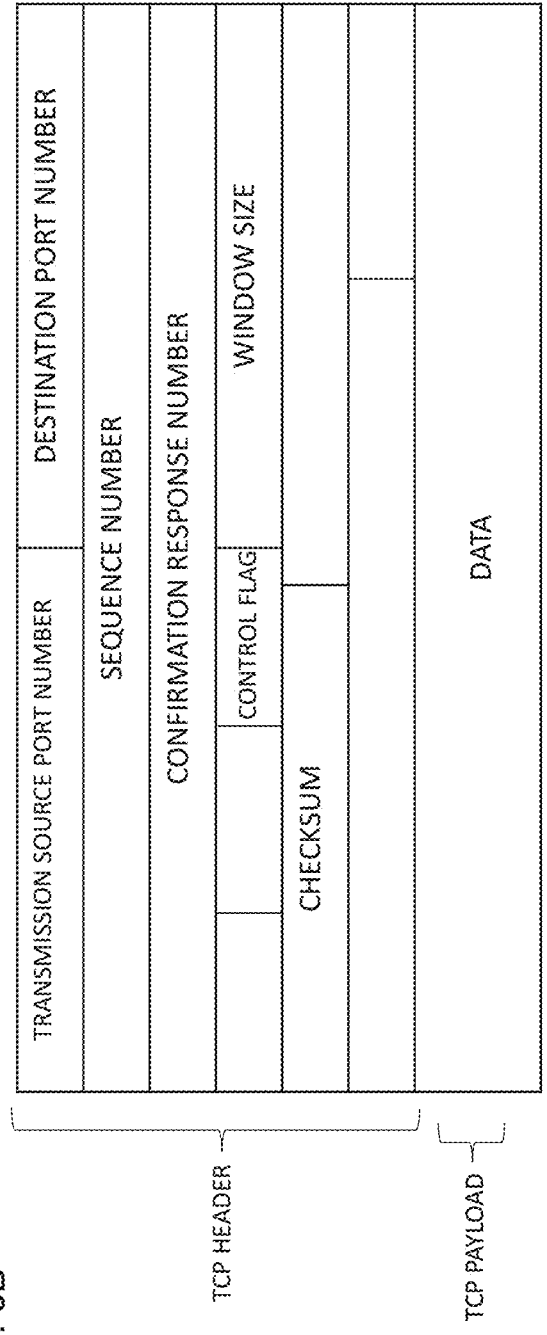
FIG. 3B shows a structure of a TCP packet.

In TCP, desired data is transmitted or received by transmitting or receiving a TCP packet in a prescribed format. FIG. 3B shows a structure of a TCP packet. The TCP packet is composed of a TCP header and a TCP payload. Information stored in the TCP header includes a transmission source port number to indicate a port number of a transmission source of the TCP packet, a destination port number to indicate a port number that is to receive the TCP packet (i.e., a port number of an apparatus to receive the TCP packet), and a checksum, similarly to the case of UDP, and also includes, e.g., the following information. A sequence number is a value to indicate a sequence of transmitted data. A confirmation response number includes the sequence number, a data size, etc., that are received from a communication counterpart. A control flag is a value to indicate, inter alia, connection or disconnection of communication, or effectiveness of a response. A window size indicates a data quantity that can be received at once on a reception side. Data having a prescribed maximum data length is stored in the TCP payload.

UDP is a connectionless protocol and makes it possible to transmit data at higher speeds, but with lower communication reliability, than in TCP. In addition, because a size of the UDP header (eight bytes) is small, it is possible to transmit and receive a correspondingly greater quantity of data pertaining to applications. However, because there is no guarantee that a packet will arrive at a destination, there is a possibility that packet loss, etc., will occur.

TCP is a connection-oriented protocol having lower risk of packet loss and higher communication reliability, but also slower transmission of data, than in UDP.

In consideration of communication between the camera body 100 and the electronic terminal 300, it is preferable to use UDP in transmission and reception of the live-view image. This is because the live-view image requires display of images in real time, similarly to the case of video streaming, and is affected by partial packet loss in only a limited manner. However, in a case where the user manipulates the electronic terminal 300 and causes a captured image to be displayed, it is desirable to use TCP, which has higher reliability. Using TCP makes it possible to reliably receive and display, on the electronic terminal 300, a captured image captured through an imaging operation by the camera body 100. However, as disclosed in Japanese Laid-open Patent Publication No. 2015-95799, display of a live-view image is suspended when a captured image is transmitted from the camera body 100 to the electronic terminal 300 by TCP. Therefore, there is a concern that transmission and reception of a live view image will be interrupted as the user performs an imaging manipulation and the user will lose an opportunity to capture an image.

In the present embodiment, in a case where an imaging manipulation is performed in the electronic terminal 300 during transmission or reception of a live-view image, the terminal controller 301 in the electronic terminal 300 selects one frame of the live-view image (i.e., a frame at a timing that is the same as or close to the timing of imaging) in accordance with the timing at which the imaging request signal is transmitted, stores the one frame as a captured image, and displays a thumbnail, rather than the body controller 140 transmitting the acquired captured image to the electronic terminal 300. This makes it possible to prevent transmission of the live-view image from being interrupted due to an imaging operation in the camera body 100.

Operations of the camera body 100, the electronic terminal 300, and an imaging system that includes the camera body 100 and the electronic terminal 300 are described below.

1-2. Operation

A wireless connection between the camera body 100 and the electronic terminal 300, and operations in each of the camera body 100 and the electronic terminal 300, are described with reference to FIGS. 4-6. In the description below, it is presumed that a prescribed application program (app) is activated in the electronic terminal 300. The app transmits and receives signals and data to and from the camera body 100 while cooperating with another program (e.g., a communication application program) as needed.

Figure 4:
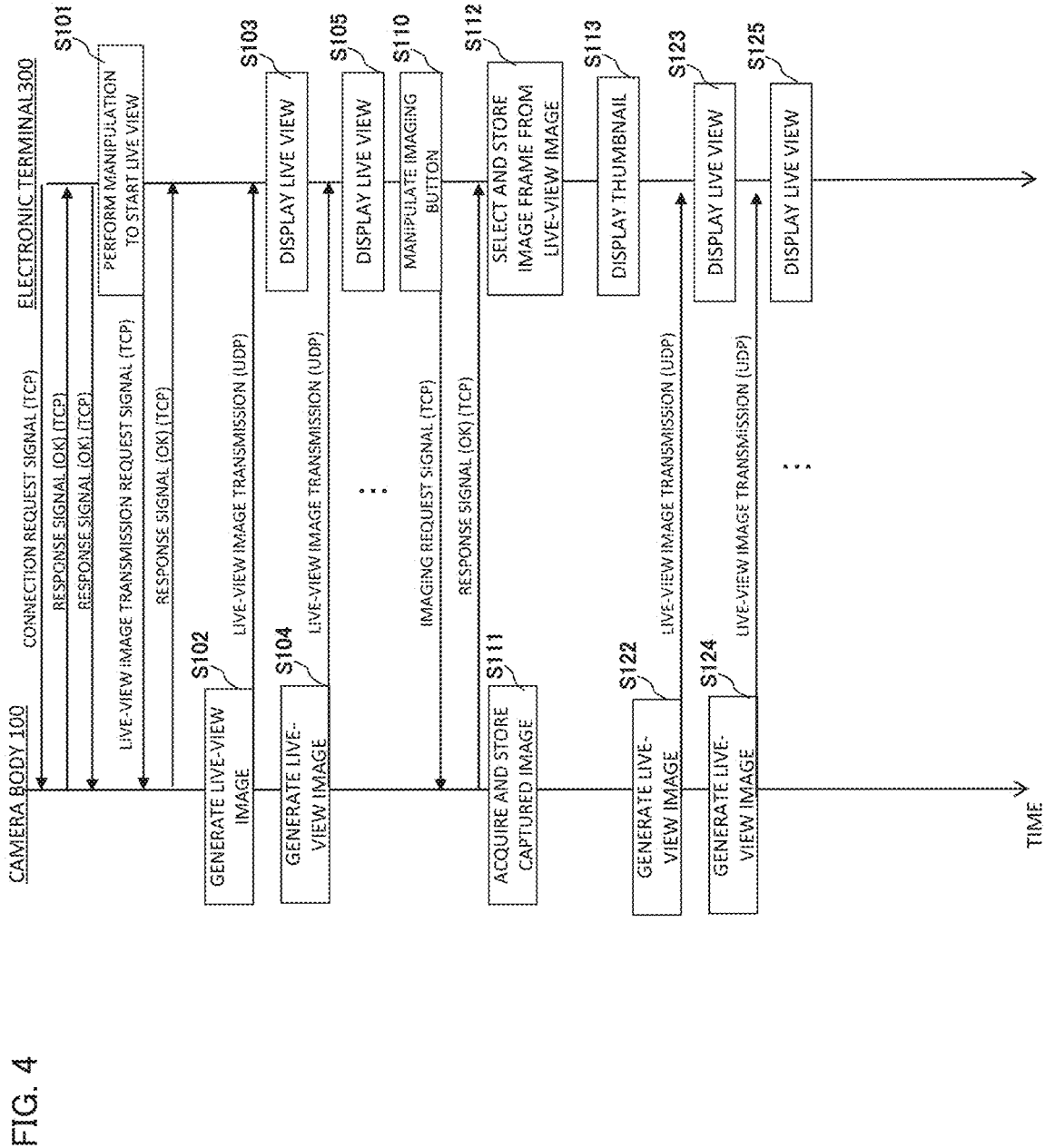
FIG. 4 is a flow chart showing an operation of the imaging device and the electronic terminal in embodiment 1.

As shown in FIG. 4, in the electronic terminal 300 in which the app has been activated, the terminal controller 301 transmits, to the camera body 100 via the transmission unit 392a (FIG. 2), a connection request signal to seek wireless connection. In the camera body 100, upon receiving the connection request signal from the electronic terminal 300 via the reception unit 191b, the body controller 140 transmits, to the electronic terminal 300 via the transmission unit 191a, a response signal to permit wireless connection. In the electronic terminal 300, upon receiving the response signal from the camera body 100 via the reception unit 392b, the terminal controller 301 transmits, to the camera body 100 via the transmission unit 392a, a response signal to permit wireless communication. According to the above, wireless communication for performing TCP communication between the camera body 100 and the electronic terminal 300 is established.

The connection request signal and the response signals are transmitted and received through TCP, and a transmission packet includes a transmission source port number and a destination port number, as shown in FIG. 3B. The connection request signal from the electronic terminal 300 to the camera body 100 may include a UDP port number for the electronic terminal 300 as data. The UDP port number is used to transmit and receive the live-view image (described below).

Next, as shown in FIG. 4, in the electronic terminal 300, when a manipulation of the live-view image as performed by the user is received from the manipulation unit 303 (S101), the terminal controller 301 generates a live-view image transmission request signal and transmits the same to the camera body 100 via the transmission unit 392a. A transmission rate of the live-view image is, for example, 15 frames per second, etc.

In the camera body 100, the body controller 140 transmits a response signal via the transmission unit 191a in response to the live-view image transmission request signal received via the reception unit 191b. At the same time, the body controller 140 generates the live-view image (S102, S104) and transmits the live-view image through UDP. At such time, a transmission packet of the live-view image is generated in a UDP format shown in FIG. 3A. The body controller 140 uses a UDP port number generated in advance as the transmission source port number, and uses the electronic-terminal 300-side UDP port number issued in advance through TCP as the destination port number.

Figure 5:
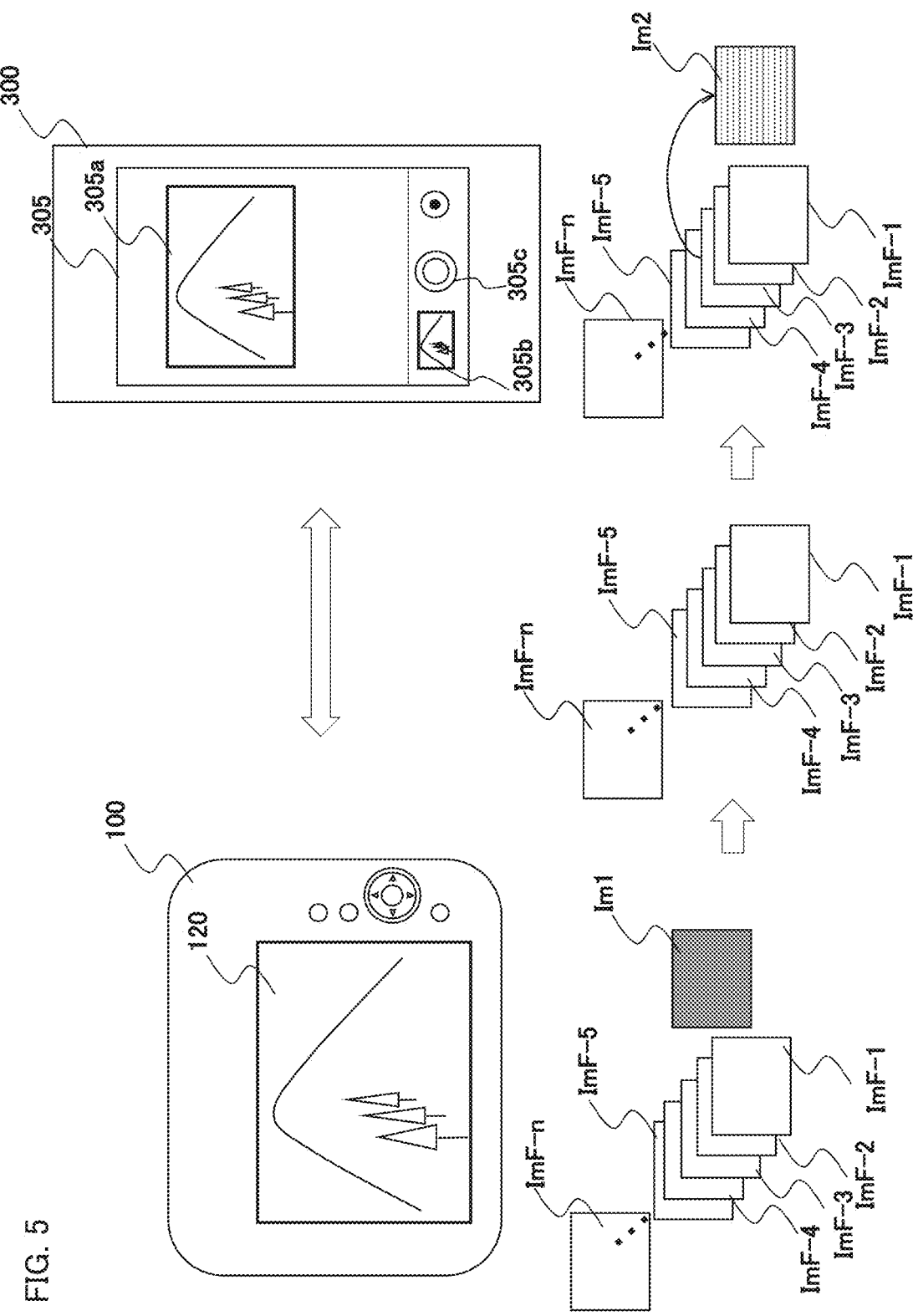
FIG. 5 is a diagram to illustrate transmission and reception of a live-view image after an imaging operation has been performed in the imaging device and the electronic terminal in embodiment 1.

As shown in FIG. 5, the live-view image is configured from a plurality (n frames) of image frames that are from ImF-1 to ImF-n.

In the electronic terminal 300, upon receiving the live-view image via the reception unit 392b, the terminal controller 301 causes the display unit 305 to display the received live-view image (S103, S105). The display unit 305 of the electronic terminal 300 displays a live-view image 305a, as shown in FIG. 5. The display unit 305 also displays an imaging button 305c. Thereafter, the body controller 140 of the camera body 100 continues to generate the live-view image and transmit the same to the electronic terminal 300 as long as no stop request signal, etc., is received from the electronic terminal 300.

As shown in FIG. 4, in the electronic terminal 300, when a manipulation of the imaging button 305c (FIG. 5) by the user is received from the manipulation unit 303 (S110), the terminal controller 301 generates an imaging request signal and transmits the same to the camera body 100 via the transmission unit 392a. This imaging request signal is transmitted through the already-established TCP.

In the camera body 100, upon receiving the imaging request signal via the reception unit 191b, the body controller 140 transmits a response signal to the electronic terminal 300 via the transmission unit 191a. At the same time, in accordance with the imaging request signal from the electronic terminal 300, the body controller 140 drives the imaging element 110 and the shutter 180 to execute an imaging operation, acquires a captured image Im1 (FIG. 5), and stores the same in the flash memory 142 (FIG. 1) (S111). The body controller 140 continuously generates the live-view image and transmits the same to the electronic terminal 300 through UDP (S122, S124, . . . ).

In the electronic terminal 300, the terminal controller 301: selects an image frame that corresponds to the timing of transmission of the imaging request, i.e., an image frame Im2 acquired at a timing near the actual captured image, from among the received live-view images ImF-1 to ImF-n; performs a reduction process to reduce a size of the selected image frame Im2; and stores the reduced-size image frame Im2 in the thumbnail image storage unit 302a (FIG. 2) (S112). The stored image frame Im2 is displayed on the display unit 305 as a thumbnail image 305, as shown in FIG. 5 (S113). The terminal controller 301 continuously causes the display unit 305 to display the live-view image received from the camera body 100 via the reception unit 392b (S123, S125, . . . ).

Thereafter, the operations from S110 to S113 are executed for each manipulation of the imaging button 305c (FIG. 5). A time lag from when the imaging request is transmitted from the electronic terminal 300 to when the next live-view image is transmitted is at most several tens of milliseconds. Accordingly, the user of the electronic terminal 300 substantially does not need to be cognizant of an interruption of the display of the live-view image caused by the imaging manipulation.

As described above, the user carries out imaging using the imaging button 305c at a desired timing while confirming the live-view image on the display unit 305 of the electronic terminal 300. The imaging frame Im2 acquired at each instance of imaging is stored in the thumbnail image storage unit 302a shown in FIG. 2. In cases where there are a plurality of stored thumbnail images, the thumbnail images can also be displayed as a list on the display unit 305.

Figure 6:
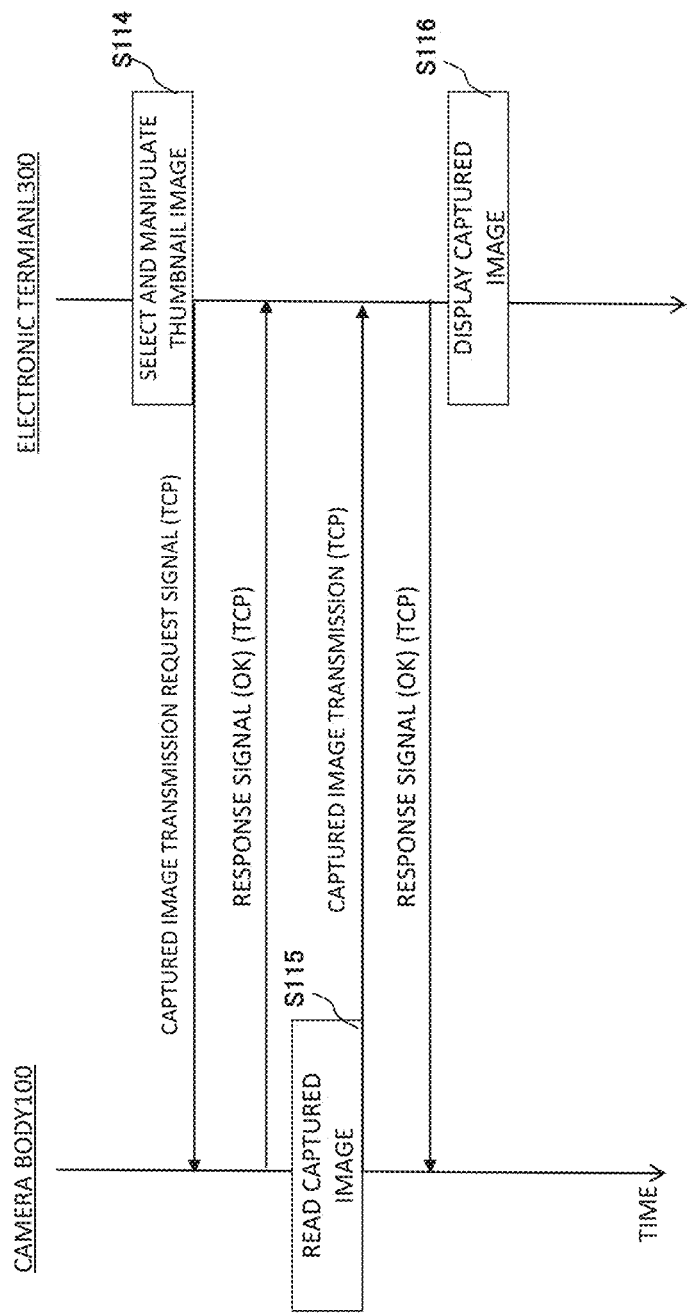
FIG. 6 is a flow chart showing an operation of the imaging device and the electronic terminal in embodiment 1.

Next, when the user seeks to confirm a captured image using the display unit 305 (FIG. 5) of the electronic terminal 300, an operation shown in FIG. 6 is executed.

First, the user selects a desired thumbnail image from among the thumbnail images showing captured images (S114). The thumbnail images are displayed as a list on the display unit 305, and the user may select a desired thumbnail image by touching the desired thumbnail image. The list display of the thumbnail images may be implemented by: requesting information for the list display of the thumbnail image from the camera-body 100 side, due to the user tapping a thumbnail image 305b; and acquiring the information. The terminal controller 301 of the electronic terminal 300 transmits a captured image transmission request signal to the camera body 100 via the transmission unit 392a through TCP due to a manipulation to select the desired thumbnail image from among the thumbnail images displayed as a list. The capture image transmission request signal includes identification information pertaining to a requested captured image. In the camera body 100, the body controller 140 transmits a response signal to the electronic terminal 300 via the transmission unit 191a. The body controller 140 reads data of a captured image that corresponds to the identification information from among the captured images stored in the flash memory 142 (S115), and transmits the data to the electronic terminal 300 via the transmission unit 191a.

In the electronic terminal 300, the terminal controller 301 temporarily stores the captured image received via the reception unit 392b, and also causes the captured image to be displayed in a region of the display unit 305 where the live-view image 305a was displayed, in lieu of the live-view image (S116).

The above operation makes it possible to transmit an actual captured image to the electronic terminal 300 from the camera body 100 and display the captured image in accordance with a manipulation to select the captured image from a thumbnail display. The live-view image is not transmitted or received during the operations in S114 to S116. However, during this period, because the user is confirming the actual captured image, it is not necessary to perform imaging at such time, and therefore no problem is presented due to interruption of the transmission and reception of the live-view image.

The captured image Im1 stored on the camera-body 100 side and the image frame Im2 stored on the electronic-terminal 300 side are associated, e.g., in the following manner. On the electronic-terminal 300 side, in a case where, e.g., the imaging button 305c (FIG. 5) is pressed four times in succession, image frames Im2 are stored in the thumbnail image storage unit 302a in an order in which the imaging button 305c was pressed, and are acquired as four thumbnail images. Upon receiving the imaging request signals, the camera body 100 stores captured images in the flash memory 142 in an order of the imaging requests. In the electronic terminal 300, each time the user presses the imaging button 305c, a most recent thumbnail image is updated and displayed on a display region for a thumbnail-image 305b on the display unit 305. When the user selects a displayed thumbnail image by tapping, etc., the four thumbnail images are displayed as a list in an order in which the thumbnail images were stored. When the user selects the first thumbnail image by tapping, etc., a captured image request signal is transmitted from the electronic terminal 300 to the camera body 100 (S114), as shown in FIG. 6, and the camera body 100 reads and transmits the captured image that corresponds to the first thumbnail image (S115). The transmitted captured image is displayed in a region of the display unit 305 where the live-view image 305a was displayed, in lieu of the live-view image (S116).

Adopting the configuration and operation as described above makes it possible for the camera body 100 to transmit a designated captured image to the electronic-terminal 300 side.

A sequence of processes (including a sequence represented as steps) performed by the camera body 100 and the electronic terminal 300 is not limited to that described above. Change of the sequence can be made within a scope that does not deviate from the gist of the present disclosure, and processes may be performed in parallel.

1-3. Effect, etc.

In embodiment 1: the camera body 100 executes an imaging operation in accordance with an imaging request and acquires the captured image Im1; and the electronic terminal 300 acquires, in lieu of the captured image, the image frame Im2 acquired from the live-view image in accordance with the timing of the imaging request, and reduce a size of the image frame Im2 to be a thumbnail image and stores the thumbnail image. Therefore, it is possible to avoid interrupting transmission and reception of the live view image during imaging, and to quickly and smoothly perform the imaging operation.

In embodiment 1, the thumbnail image stored in the electronic terminal 300 is different from the actual captured image. However, according to the operation shown in FIG. 6, the electronic terminal 300 acquires the actual captured image, and the user can confirm the captured image on the electronic terminal 300. At such time, transmission and reception of the live-view image are interrupted, but because the user does not need to perform an imaging manipulation at such time, no problem pertaining to, inter alia, being unable to perform imaging is presented due to the interruption of the transmission and reception of the live-view image.

In addition, in embodiment 1, fast communication of images using UDP is implemented in transmission and reception of the live-view image, and when the user seeks to confirm the captured image, highly reliable communication using TCP is implemented in transmission and reception of the captured image. Therefore, it is possible for the user to reliably confirm the actual captured image on the electronic terminal 300 while quickly and smoothly performing the imaging operation.

2. Embodiment 2

A camera body 100 and an electronic terminal 300 according to embodiment 2 are described with reference to FIGS. 7 and 8.

The configurations of the camera body 100 and the electronic terminal 300 are the same as those in embodiment 1 shown in FIGS. 1-3, and therefore descriptions of these configurations are omitted. As pertains to matters not particularly described in embodiment 2, embodiment 1 and modification examples thereof are applied, provided there are no particular contradictions.

In embodiment 1, the thumbnail image is generated from the image frame of the live-view image and is displayed. However, there are cases where the live-view image is transmitted in a state in which, e.g., a part of the image has color applied through peaking (a function to apply color to high-contrast portions and display the image with the colored portions); therefore, the thumbnail image could also be displayed with color applied thereto, the thumbnail image being displayed differently than the actual captured image. In the present embodiment, in a case where an imaging manipulation is performed in the electronic terminal 300 during transmission or reception of the live-view image, the body controller 140 exchanges the acquired captured image with one image frame of the live-view image (i.e., a frame at a timing that is the same as or close to the timing of imaging). An identification flag (one example of identification information) is applied to the exchanged image frame. The identification flag indicates that the image frame is the captured image. The changed live-view image is transmitted to the electronic terminal 300 through UDP and is displayed as a thumbnail image by the electronic terminal 300.

Operations of the camera body 100 and the electronic terminal 300 according to embodiment 2 are described in detail below.

Figure 7:
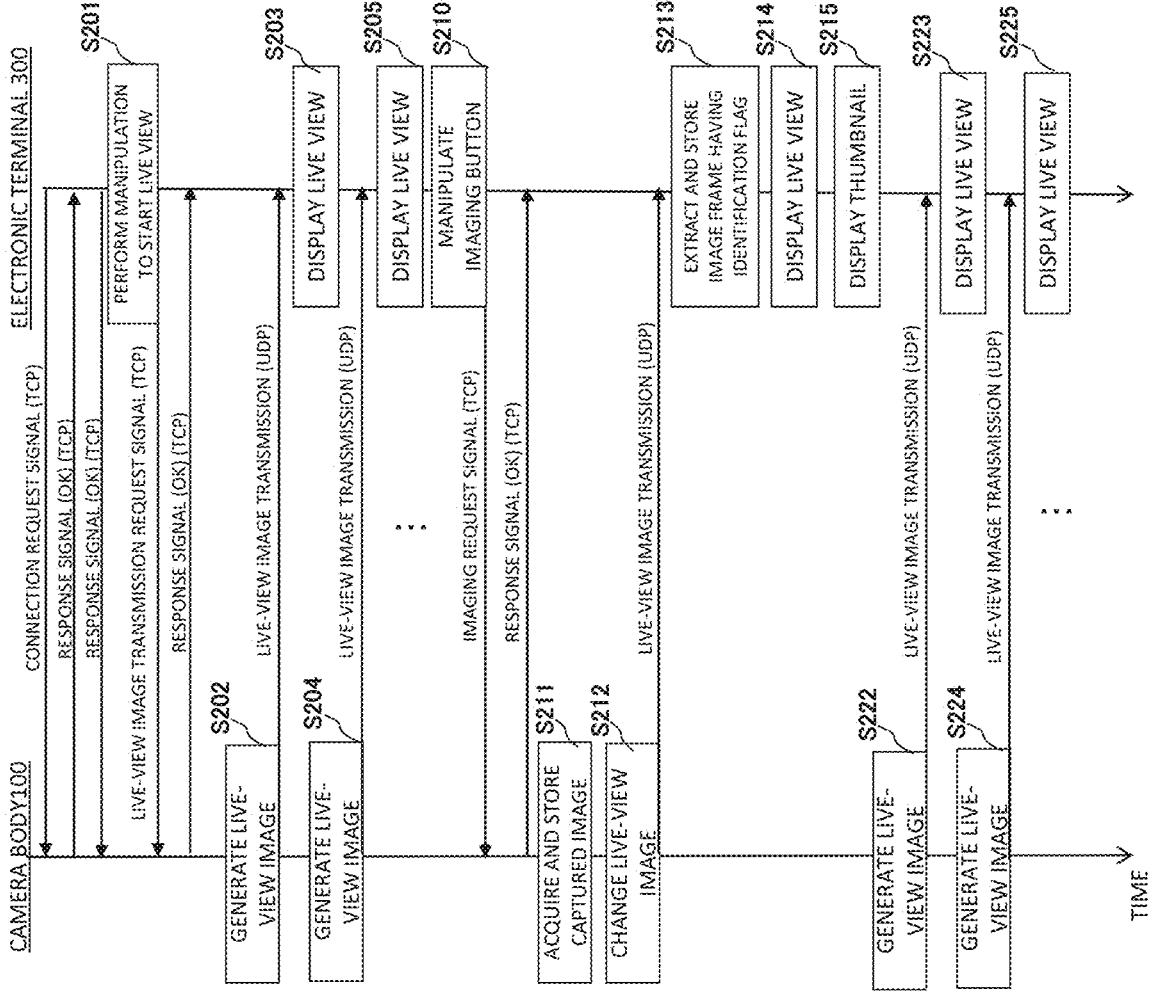
FIG. 7 is a flow chart showing an operation of the imaging device and the electronic terminal in embodiment 2.

In FIG. 7, steps S201 to S205 and the communications performed by the camera body 100 and the electronic terminal 300 between said steps are, respectively, the same as steps S101 to S105 in FIG. 4 and the communications performed by the camera body 100 and the electronic terminal 300 between said steps.

In the electronic terminal 300, when a manipulation of the imaging button 305c (FIG. 8) by the user is received from the manipulation unit 303 (S210), the terminal controller 301 generates an imaging request signal and transmits the same to the camera body 100 via the transmission unit 392a. The imaging request signal is transmitted through the already-established TCP.

In the camera body 100, upon receiving the imaging request signal via the reception unit 191b, the body controller 140 transmits a response signal to the electronic terminal 300 via the transmission unit 191a. At the same time, in accordance with the imaging request signal from the electronic terminal 300, the body controller 140 drives the imaging element 110 and the shutter 180 to execute an imaging operation, acquires a captured image Im1 (FIG. 8), and stores the same in the flash memory 142 (FIG. 1) (S211).

The body controller 140 furthermore performs a change process on the live-view image (S212). More specifically, as shown in FIG. 8, the body controller 140 replaces an image frame (in the present example, ImF-3) acquired at the timing when the actual captured image was acquired, from among the plurality (n frames) of image frames (ImF-1 to ImF-n) constituting the live-view image, with the acquired captured image Im1. The image frame ImF-3 acquired at the timing when the actual captured image was acquired is an image frame at a timing when the body controller 140 received the imaging request signal or a timing when the imaging operation was executed, or is an image frame acquired at a timing substantially equivalent to said timing. Provided that the timing at which the captured image was acquired is within a prescribed time span (e.g., within several tens of milliseconds), said timing is permitted.

The body controller 140 applies the identification flag to a replaced captured image frame Im1'. The identification flag indicates that the captured image frame Im1' is the captured image. The live-view image changed by the replacement is continuously transmitted to the electronic terminal 300 through UDP. The identification flag is applied as, e.g., a header (first byte) provided to data in a payload of a UDP packet. Using this header makes it possible to apply the identification flag to the image frame. Alternatively, the identification flag may be a watermark applied to the captured image frame Im1'.

The body controller 140 continuously generates the live-view image and transmits the same to the electronic terminal 300 through UDP (S222, S224, . . . ).

In the electronic terminal 300, upon detecting the identification flag within the received live-view image, the terminal controller 301 extracts the captured image frame Im1' to which the identification flag is applied and stores the captured image frame Im1' in the thumbnail image storage unit 302a (FIG. 2) (S213). The terminal controller 301 causes the display unit 305 to display the live-view image after extraction of the captured image frame Im1' to which the identification flag is applied (S214). The terminal controller 301 furthermore causes the display unit 305 to display the stored captured image frame Im1' as a thumbnail image 305b that has been reduced in size (S215). The terminal controller 301 continuously causes the display unit 305 to display the live-view image received from the camera body 100 via the reception unit 392b (S223, S225, . . . ).

The displayed live-view image may be displayed after the captured image frame Im1' is extracted, or an image frame near the extracted captured image frame Im1' may be displayed twice.

Figure 8:
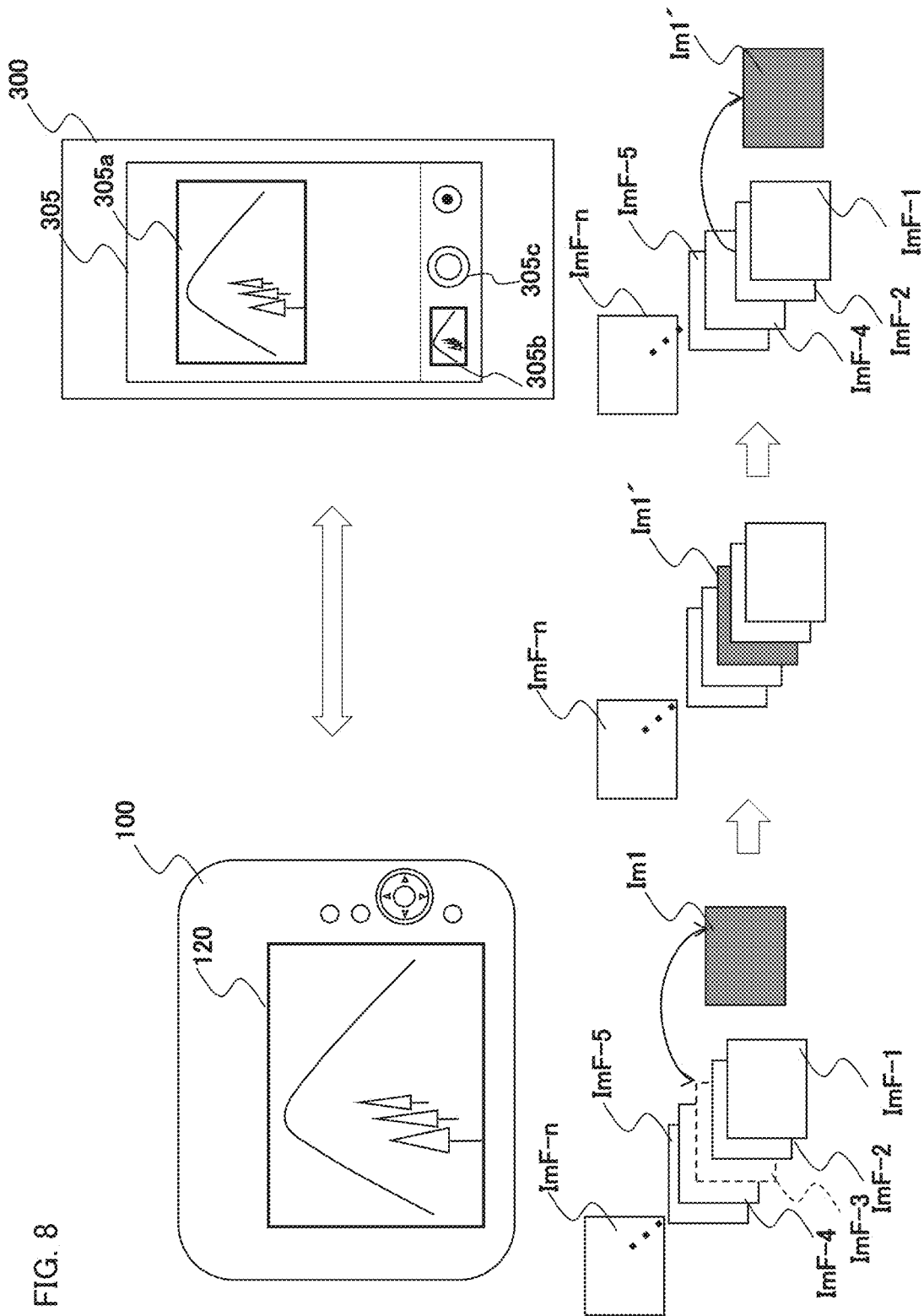
FIG. 8 is a diagram to illustrate transmission and reception of a live-view image after an imaging operation has been performed in an imaging device and an electronic terminal in embodiment 2.

Thereafter, the operations from S210 to S215 are executed for each manipulation of the imaging button 305c (FIG. 8).

In the electronic terminal 300, because the live-view image is received through UDP, communication reliability is low, and there is a possibility that the image frame having the identification flag will not be received and the thumbnail image 305b will not be displayed as the captured image. In such a case, it is possible to execute the following process and supplement the reliability. First, as a captured image, an image frame near the image frame to which the identification flag is applied (i.e., the captured image) is subjected to a reduction process, and the display unit 305 is caused to display the reduced-size image as a thumbnail image 305b. Provided that the image frame to which the identification flag is applied arrives within, e.g., 0.5 seconds or less, the displayed thumbnail image is replaced by a thumbnail image of the image frame to which the identification flag is applied, and the replaced thumbnail image is displayed on the display unit 305. This makes it possible to avoid a situation where the electronic terminal 300 does not display the thumbnail image 305b as the captured image after the imaging manipulation.

Alternatively, in the electronic terminal 300, in a case where no identification flag has been detected within a prescribed time from the imaging manipulation, the terminal controller 301 may be configured so as to transmit a re-transmission request signal to the camera body 100 through TCP.

The above operation makes it possible, in the electronic terminal 300, to display the live-view image without interruption by an imaging operation, and for a user to confirm an image unaffected by peaking, etc., in the thumbnail display. The image displayed as a thumbnail is a captured image that has replaced a corresponding live-view image frame and is transmitted through UDP. Accordingly, when the user seeks to confirm the actual captured image, similarly to embodiment 1, the data corresponding to the captured image may be transmitted from the camera body 100 to the electronic terminal 300 and displayed on the display unit 305 in accordance with the manipulation to select a desired thumbnail image, as shown in FIG. 6. This makes it possible for the user to confirm the actual captured image on the electronic terminal 300. In addition, in the same manner as in embodiment 1, because the user is not performing an imaging manipulation during a period in which the user confirms the actual captured image on the display unit 305 of the electronic terminal 300, the effect of interruption of the display of the live-view image is minimized.

In the embodiment described above, the imaging request signal transmitted from the electronic terminal 300 to the camera body 100 may be a signal to request imaging of consecutive shots. In the case of consecutive shots, a captured image is stored in the camera body 100 for each of the consecutive shots, corresponding frames of the live-view image are replaced by the captured images, to each of which the identification flag has been applied, and the replaced live-view image is transmitted to the electronic terminal 300.

3. Other Embodiments

As indicated above, embodiments have been described to exemplify features disclosed in the present application. However, the features in the present disclosure are not limited to these embodiments; the present disclosure is also applicable to embodiments in which various changes, shifts, additions, omissions, etc., have been made as appropriate. The constituent elements described in the above embodiments can also be combined to achieve new embodiments.

(1) In the embodiments described above, the imaging request signal transmitted from the electronic terminal 300 to the camera body 100 may be a signal to request capture of a video image. In the case of a video image, for example, the imaging button 305c shown on the display unit 305 of the electronic terminal 300 shown in, e.g., FIG. 5 or 8 is touched by the user at a start time and an end time of video-image capture. According to the touch operation performed at the start time and the end time of video-image capture, an imaging start request signal and an imaging end request signal are transmitted to the camera body 100 through TCP. The display unit 305 may display a thumbnail image obtained by selecting a prescribed image frame from the live-view image received from the camera body 100 in accordance with the timing at which the imaging start request signal is transmitted to the camera body 100, and by reducing a size of the prescribed image frame.

(2) In the embodiments described above, communication between the camera body 100 and the electronic terminal 300 may be performed in a wired manner. In the case of wired communication, the camera body 100 is provided with an interface circuit and a connection terminal for performing communication that conforms to a prescribed communication standard for connecting to an external device, e.g., the universal serial bus (USB) standard. Similarly, the electronic terminal 300 is provided with an interface circuit and a connection terminal for performing communication that conforms to the USB standard, etc.

(3) In the embodiments described above, the camera body 100 and the electronic terminal 300 have characteristic features in terms of respective configurations and functions. In the same manner, the imaging system that includes the camera body 100 and the electronic terminal 300, an imaging method executed by the camera body 100 and/or the electronic terminal 300, and a computer program or application for executing the imaging method have characteristic features in terms of these configurations and functions.

REFERENCE NUMERALS

1 Camera system
100 Camera body

110 Imaging element
112 Timing generator
120 Liquid-crystal monitor
121 View-finder
130 Manipulation unit
140 Body controller
141 DRAM
142 Flash memory
150 Body-side mount
160 Power supply
170 Card slot
171 SD card
180 Shutter
181 Shutter drive unit
191 Communication unit
191a Transmission unit
191b Reception unit
200 Exchangeable lens
210 Zoom lens
211 Zoom lens drive unit
220 OIS lens
221 OIS drive unit
222 Position sensor
223 OIS processing unit
230 Focus lens
231 Focus drive unit
240 Lens controller
241 DRAM
242 Flash memory
250 Lens-side mount
260 Aperture
261 Aperture drive unit
300 Electronic terminal
301 Terminal controller
302 Storage unit
302a Thumbnail image storage unit
302b App storage unit
303 Manipulation unit
305 Display unit
305a Live-view image
305b Thumbnail image
305c Imaging button
392 Communication unit
392a Transmission unit
392b Reception unit
AX Optical axis

What is claimed:

1. An imaging device capable of connecting to an electronic terminal, the imaging device comprising:
an imaging unit configured to capture an image of a subject and generate a live-view image;
a first transmission unit configured to transmit the live-view image to the electronic terminal;
a first reception unit configured to receive, from the electronic terminal, an imaging request for the imaging device; and
a first controller configured to control the imaging unit, the first transmission unit, and the first reception unit,
the first controller configured to acquire a first image frame, which is a captured image after executing imaging using the imaging unit, in response to the imaging request,
the first transmission unit configured to transmit the live-view image to the electronic terminal after the imaging request without any interruption caused by transmission of the first image frame in response to the imaging request,
the electronic terminal configured to extract, after the imaging request, a prescribed live-view image from the live-view image received from the first transmission unit, the electronic terminal configured to cause a display unit of the electronic terminal to display the extracted live-view image as the captured image, the electronic terminal configured to cause a memory to store the extracted live-view image as the captured image.

2. The imaging device according to claim 1, wherein the first controller is configured to:
replace an image frame of the live-view image with the first image frame, thereby changing the live-view image; and
transmit the changed live-view image to the electronic terminal via the first transmission unit.

3. The imaging device according to claim 2, wherein the first image frame includes identification information indicating that the first image frame is the captured image.

4. An electronic terminal capable of connecting to an imaging device, the electronic terminal comprising:
a manipulation unit configured to receive input of a manipulation for operating the imaging device;
a second transmission unit configured to transmit an imaging request to the imaging device;
a second reception unit configured to receive a live-view image from the imaging device;
a display unit configured to display the live-view image; and
a second controller configured to control the manipulation unit, the second transmission unit, the second reception unit, and the display unit,
the second reception unit configured to receive the live-view image after the imaging request without any interruption caused by transmission of a second image frame, which is a captured image acquired by the imaging device by executing imaging in response to the imaging request,
the second controller configured to extract a prescribed live-view image from the live-view image received from the imaging device in accordance with a timing at which the imaging request is transmitted, the second controller configured to cause the display unit to display the extracted prescribed live-view image as the captured image, the second controller configured to cause a memory to store the extracted prescribed live-view image as the captured image.

5. The electronic terminal according to claim 4, wherein the second controller is configured to extract the second image frame by detecting identification information included in the second image frame acquired from the live-view image after the imaging request.

6. The electronic terminal according to claim 5, wherein the second controller is configured to:
extract the second image frame from the live-view image, thereby changing the live-view image; and
cause the display unit to display the changed live-view image.

7. The electronic terminal according to claim 4, wherein the second controller is configured to reduce a size of the second image frame to be smaller than a size of the live-view image and causes the display unit to display the reduced-size second image frame, and
the manipulation unit is configured to receive an input for selecting the reduced-size second image frame displayed on the display unit.

8. The electronic terminal according to claim 7, wherein in response to the manipulation unit receiving the input for selecting the reduced-size second image frame displayed on the display unit, the second controller causes the second transmission unit to transmit a captured image transmission request, the second reception unit receives the captured image in response to the captured image transmission request, and the second controller causes the display unit to display the received captured image.

9. An imaging system comprising:

an electronic terminal; and an imaging device capable of connecting to the electronic terminal, the image device including an imaging unit configured to capture an image of a subject and generate a live-view image, a first transmission unit configured to transmit the live-view image to the electronic terminal, a first reception unit configured to receive, from the electronic terminal, an imaging request for the imaging device, and a first controller configured to control the imaging unit, the first transmission unit, and the first reception unit, the first controller configured to acquire a first image frame, which is a captured image after executing imaging using the imaging unit, in response to the imaging request, the first transmission unit configured to transmit the live-view image to the electronic terminal after the imaging request without any interruption caused by transmission of the first image frame in response to the imaging request, the electronic terminal including a manipulation unit configured to receive input of a manipulation for operating the imaging device;

a second transmission unit configured to transmit an imaging request to the imaging device;

a second reception unit configured to receive the live-view image from the imaging device;

a display unit configured to display the live-view image; and a second controller configured to control the manipulation unit, the second transmission unit, the second reception unit, and the display unit, the second reception unit configured to receive the live-view image after the imaging request without any interruption caused by transmission of the first image frame, the electronic terminal and the imaging device being capable of communicating through a first communication protocol and a second communication protocol that is less reliable but faster than the first communication protocol, the electronic terminal and the imaging device configured to communicate using the second communication protocol when transmitting or receiving the live-view image, and the electronic terminal and the imaging device configured to communicate using the first communication protocol when transmitting or receiving an image captured by the imaging device.

* * * * *